No. 732,035. PATENTED JUNE 30, 1903.
S. M. BARRÉ & C. MIGNAULT.
PASTEURIZER.
APPLICATION FILED JUNE 21, 1902.
NO MODEL. 2 SHEETS—SHEET 1.
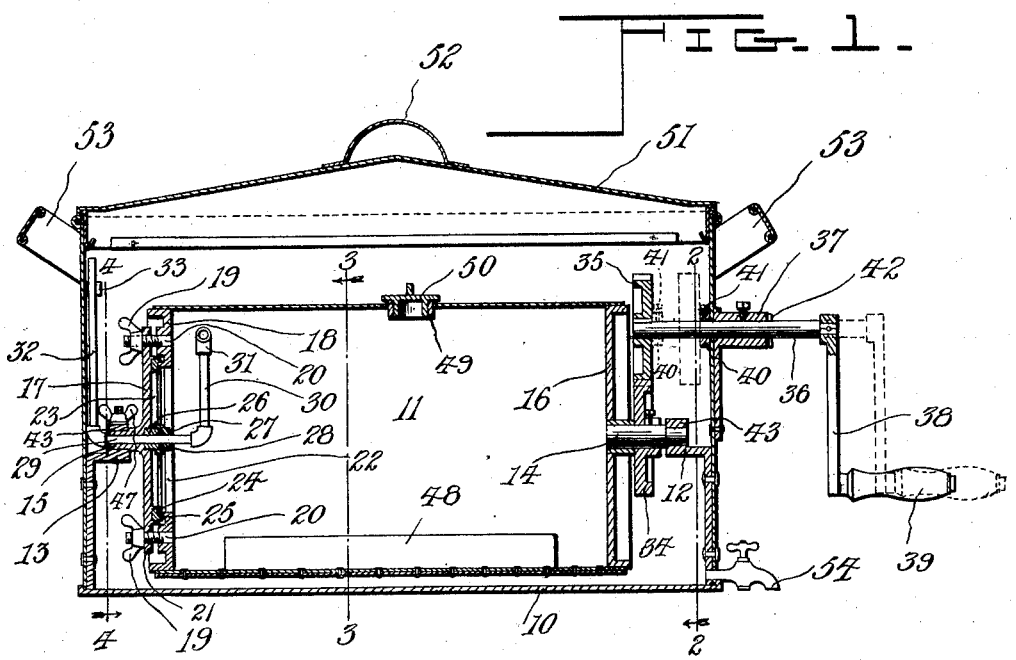
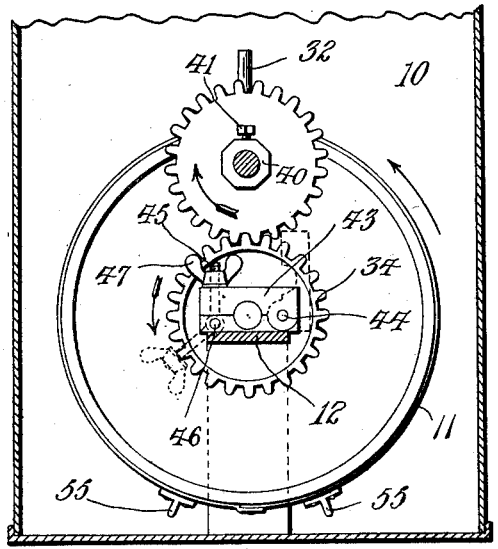
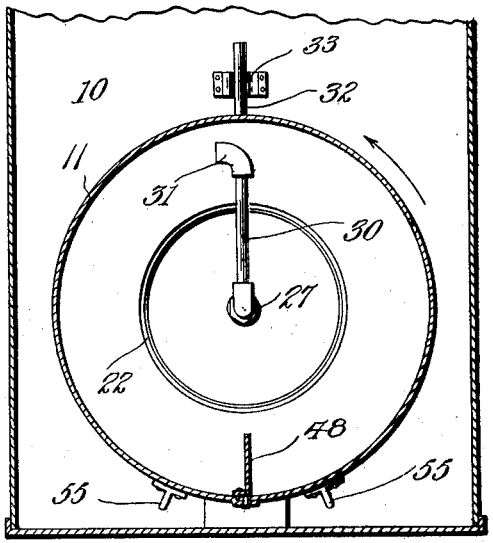
Witnesses:
Jed Page
George W. Colles
Stanislaus M. Barré,
Charles Mignault, Inventors,
By Marion & Marion
Attorneys

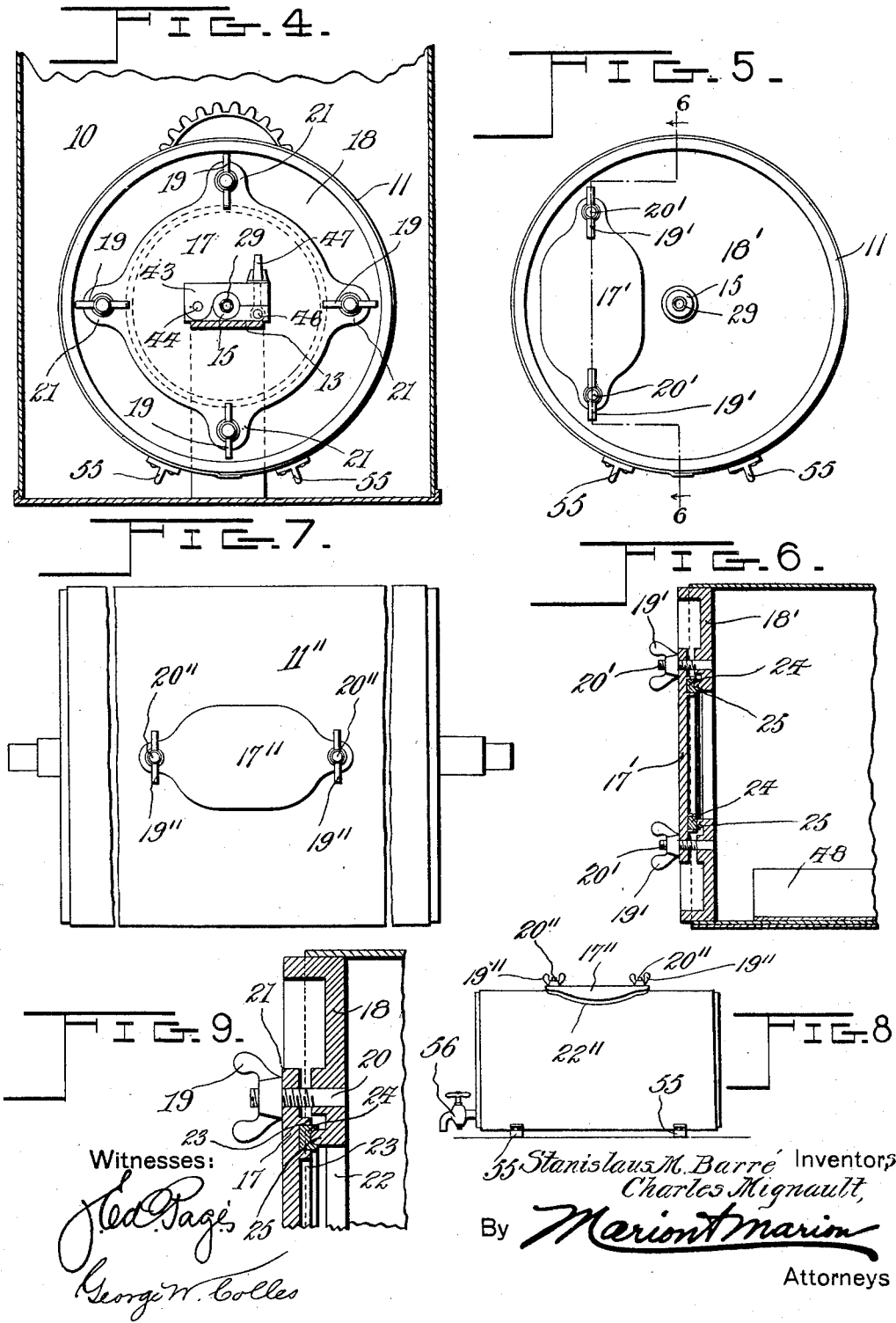

No. 732,035. Patented June 30, 1903.

UNITED STATES PATENT OFFICE.

STANISLAUS MORNER BARRÉ AND CHARLES MIGNAULT, OF WINNIPEG, CANADA.

PASTEURIZER.

SPECIFICATION forming part of Letters Patent No. 732,035, dated June 30, 1903.

Application filed June 21, 1902. Serial No. 112,633. (No model.)

*To all whom it may concern:*

Be it known that we, STANISLAUS MORNER BARRÉ and CHARLES MIGNAULT, subjects of the King of Great Britain, both residing at Winnipeg, county of Selkirk, Province of Manitoba, Canada, have invented certain new and useful Improvements in Pasteurizers; and we do hereby declare that the following is a full, clear, and exact description of the invention, such as will enable others skilled in the art to which it appertains to make and use the same.

Our invention relates to an apparatus especially designed for sterilizing milk and similar substances which require to be heated to a certain definite degree of temperature, and our apparatus may also be used to advantage for ripening cream and other like purposes.

The object of our invention is to produce an apparatus which can be readily and quickly manipulated to put in, sterilize, and remove the liquid and which shall perform its functions quickly and thoroughly, and, further, one which is contained within a limited space, which can be cheaply manufactured, and is adaptable to all necessary purposes.

To these ends our invention consists in the main of a vessel adapted to contain a waterbath or other liquid heated to a definite temperature and having rotatably mounted within the same a closed drum or vessel which is adapted to contain the liquid to be sterilized. The said inner vessel has trunnions on each end thereof, one of which is provided with a gear-wheel arranged to mesh with a second gear-wheel on an axle actuated by a crank-handle from without the main vessel, and in the opposite head of the drum is provided a removable closure, through which the liquid may be inserted and removed Our invention further consists in forming an axial aperture through one of the heads of the closed drum and the trunnion carried thereby and in locating therein a doubly-bent tube or pipe whose ends extend vertically—that is to say, at right angles to the axis of rotation of the drum and above the level of the liquid contained within the same—this tube being open at both ends, and thus arranged to give at all times free exit to the gases produced within the drum by the sterilization or pasteurization process. In the preferred or smaller sizes of the apparatus the above-mentioned removable head through which the liquid is inserted covers practically the whole of the stationary head or end of the drum, and therefore has fixed thereon one of the trunnions on which the drum turns and through which is formed, preferably, the aperture in which is placed the said doubly-bent tube, so that the latter is removable with the head when the liquid is inserted into or removed from the drum; but in other forms of the machine we may arrange a separate removable head or closure at one side of the trunnion or upon the side of the drum, if desired, so that the liquid may be inserted and removed when desirable without removing the drum from the vessel in which it turns. Moreover, we provide means at one side of the outer vessel for holding and retaining the end of the said doubly-bent tube in vertical position, so as to prevent it from turning with the drum.

Our invention further consists in providing on the interior of the sterilizing-drum a radial paddle or fin which is adapted to turn over the liquid at each revolution of the drum and in providing an aperture closed by a plug at the side of the drum, whereby the temperature of the interior may be readily ascertained without disturbing the position of the drum in the main vessel, and, further, in providing small radial legs or standards on the circumference of the drum, so that the latter will stand by itself when removed from the outer vessel.

Our invention further consists in the particular arrangement provided, whereby the said inner vessel or drum may be removed from the outer vessel, said arrangement consisting in arranging the crank-shaft by which the drum is turned to be slid back out of the way and forming one or both of the bearings which support the trunnions of the drum with removable caps, so that one end of the drum may be first rotated about the other end and subsequently the drum as a whole lifted out of the outer vessel and placed upon a table.

Our invention further consists in the construction and combination of parts herein-after described, and more particularly pointed out in the claims.

In the drawings accompanying this specification we have shown the preferred form of our invention, together with several modifications thereof, and herein—

Figure 1 is a longitudinal vertical central section of the preferred form of apparatus as arranged in operative position. Fig. 2 is a transverse vertical section taken on the line 2 2 of Fig. 1 looking in the direction of the arrow. Fig. 3 is a similar transverse section taken on the line 3 3 of Fig. 1 looking in the direction of the arrow. Fig. 4 is a similar view taken on the line 4 4 of Fig. 1 looking in the direction of the arrow. Fig. 5 is an end elevation of the sterilizing-drum, showing an alternative form of closure for the same especially adapted to larger sizes. Fig. 6 is a transverse section of the end of the drum shown in Fig. 5, illustrating the same modification. Fig. 7 is a plan view of a second modified form of drum provided with a side closure. Fig. 8 is a side elevation of the drum shown in Fig. 7. Fig. 9 is a fragmentary cross-section through the head of the drum, on an enlarged scale, to illustrate the manner of hermetically sealing the same.

The same numerals of reference denote like parts in all the figures of the drawings.

The main parts of the apparatus consist of an outer vessel 10, adapted to contain a water-bath heated to any desirable temperature, and an inner vessel 11, which is in the form, as shown, of a cylindrical drum (this being the preferred though not the essential form) adapted to contain the milk or other substance to be pasteurized. The vessel 10, as herein shown, is of elongated oblong or oval shape and may be made of either wood or sheet metal or other material, as desired, and it has at each end thereof in the center a pair of trunnion-blocks 12 and 13, which project inwardly from the sides and are adapted to support the vessel 11, which is rotatably mounted upon trunnions 14 and 15, the former of which is mounted in a non-removable head 16, closing the end of the drum 11; but the trunnion 15, as shown in Fig. 1, forms a boss or extension on a removable closure or door 17, which is secured to the fixedly-mounted head 18 of the drum by means of thumb-nuts 19, turning on studs 20, fixed in the head and passing through suitable apertures in four radial lugs 21, formed on the closure 17. The closure 17 is a casting or plate, which covers the central aperture 22 in the head 18, and it has around its rim a pair of concentric flanges 23, between which is mounted a strip of suitable packing material 24, which is adapted to coact with an upstanding flange 25, formed around the margin of the aperture 22 in the head 18, thus causing the packing material 24 to be forced against the flange 25 and preventing the exit or entrance of liquid. At the center of the plate 17 is mounted, as above stated, a trunnion 15, this being formed with a central bore or aperture, and at its inner side is a threaded plug 26, screwed into a recess in the plate and arranged to receive a packing-gland 27, forming a stuffing-box 28. Through the central bore in the trunnion passes, as shown, a tube 29, which is turned upwardly at each end, and its inner end 30 is surmounted by an elbow 31, which is as close as possible to the cylindrical wall of the drum and is turned in the direction of rotation of the drum, so as to prevent any possible splashing or entrance of the liquid thereinto. The opposite end 32 of the tube 29 rises vertically to a point near the top of the outer vessel 10, so as to be completely above the level of the water-bath contained therein, and it is arranged to be held in this position during the rotation of the drum by means of a clip 33, which is of a resilient nature, so that the end 32 of the tube may be snapped thereinto and withdrawn therefrom by a slight relative bending of the clip and tube.

The trunnion 14, mounted in the fixed head 16, has exteriorly of the latter a gear-wheel 34 fixed thereto, and with this meshes a second gear 35, which is mounted on a crank-shaft 36, journaled in a bearing-block 37, carried by the end wall of the outer vessel, and the shaft 36 has keyed to its outer end a crank 38, having a suitable operating-handle 39. This shaft 36, as shown, extends inwardly some distance, so that the gear 35, carried thereby, meshes with the gear 34 ordinarily, but is so far from the end wall of the vessel 10 that it may be drawn back into the position shown in dotted lines by pulling the crank 38 outwardly, thus freeing the gear 34 and permitting the drum 11 to be removed from the vessel, the manner of accomplishing which will be presently described. To retain the shaft 36 and gear 35 in operative position during the sterilizing process, however, we may provide a small collar 40, which is adapted to be fixed in any position on the crank-shaft by a set-screw 41, so that when secured in the position shown in full lines in Fig. 1 the crank-shaft has no longitudinal movement, being also preferably provided with a small pin 42 on the exterior of the journal-block 37 to prevent the gear 35 from striking against the drum 11.

To enable the drum 11 to be readily removed, we provide each of the bearing-blocks 12 and 13 with a pivoted cap 43, which is hinged to the bearing-block by a transverse pin 44 and is secured in position by means of a swinging stud 45, pivoted on a second transverse pin 46 and having a wing-nut 47 on its upper extremity. It will be understood that the cap 43 is forked or slotted at its end, so as to permit the stud 45 to pass thereinto, and when swung down out of the way, as indicated by the dotted lines in Fig. 2, the cap 43 can be turned and raised, so as to permit the trunnion to be lifted out of its bearing.

On the inner side of the drum there is provided a longitudinal radial flange or paddle 48, which is adapted to agitate and turn over the milk or other liquid undergoing sterilizing at each revolution of the drum, and at the opposite side may be provided an aperture 49, which is closed by a screw-plug 50, this being for the purpose of permitting the temperature of the liquid to be taken.

We preferably provide the vessel 10 with a series of four radial feet 55, which are adapted to keep the vessel from rolling when taken out of the vessel 10 and placed on the table.

The outer vessel 10 is preferably provided with a cover 51 closing its upper side and provided with a handle 52, and the vessel itself may be provided with handles 53 and with a draw-off cock 54 at the bottom to permit of the ready removal of the water-bath contained in the vessel 10.

The mode of operation of the invention as thus far described is as follows: If milk is to be pasteurized, the outer vessel 10 is first filled with water until the interior cylinder is covered to about three-fourths its height, and either hot water may be used to save time or the vessel may be placed on a stove and heated to the desired temperature, which may be graded by a thermometer. The drum 11 is removed from the vessel 10 by unscrewing the thumb-nuts 47, as above described, sliding back the collar 40 on the crank-shaft 36, and subsequently pulling out the crank-shaft into the position shown in dotted lines, when the drum 11 is turned about the trunnion 14 as a pivot, the trunnion 15 being raised, and it may then be lifted out of the vessel 10. The closure 17 is next removed by unscrewing the nuts 19, when the milk or cream is placed within the vessel, the closure-plate screwed on again, and the drum returned to its original position, the tube 29 being held vertical and snapped into the clip 33. The crank-shaft 36 is slid back, so as to cause the gear 35 to engage with the gear 34 and secured in this position by means of the collar 40. By now turning the crank 39 the drum 11 is rotated and the milk contained therein turned over constantly by the paddle 48, so as to cause it to assume the temperature of the water-bath, which is ordinarily about 140° or 150° Fahrenheit. The crank may be turned at a speed of about twenty revolutions a minute. As soon as the milk has reached the proper temperature, which can be ascertained by inserting a thermometer through the aperture 49, the water is drawn off through the cock 54. The milk should be allowed to remain at a temperature not lower than 140° for about twenty to twenty-five minutes. The pasteurizer having been removed from the stove, cold water is now poured into the outer vessel and by continuing the rotation of the crank-handle 39 the milk is cooled down to 40° or 45° or to any desired temperature and the process is completed.

In using the apparatus for ripening cream the water-bath is maintained at a temperature of 65° to 70° and the cream allowed to remain at that temperature until it has acquired a clean sour taste and is thickened, so as to show small fine grains of casein when placed on the finger. After this the cream may be cooled by cold water, as before, to the churning temperature and is then ready for churning.

In the case of large-size apparatus where a large quantity of milk or cream is to be treated at one time, it will be sufficient to form one of the heads 18' of the drum with an opening at one side of the center which is closed by a closure-plate 17', connected to the head by a pair of studs 20', having wing-nuts 19', arranged in the same manner as shown in Fig. 1, except that one side only of the head is open. The trunnion 15 and tube 29 would be in this case fixed within the head 18', or, as shown in Fig. 7, we may form the drum (designated 11'') with a side opening 22'', covered by a closure-plate 17'', secured by studs 20'' and nuts 19'' in those cases in which it is inconvenient to turn the drum on end. We may also provide the drum 11'' with a draw-off cock 56 at one end to permit the milk to be readily emptied and removed from the drum.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

Having thus described our invention, what we claim as new, and desire to secure by Letters Patent, is—

1. A pasteurizer comprising an outer vessel adapted to contain a water-bath and having bearing-supports therein, a closed interior drum adapted to contain the liquid to be pasteurized and having trunnions resting in said supports, a spur-gear mounted on one of said trunnions, a manually-rotatable shaft journaled in the wall of said vessel and longitudinally displaceable in its bearings, and a spur-gear mounted on said shaft and adapted to mesh with said first-mentioned gear when said shaft is pushed inwardly and to be withdrawn out of the way of said gear when drawn outwardly, whereby said drum may be raised out of said vessel.

2. A pasteurizer comprising an outer vessel adapted to contain a water-bath and having bearing-supports therein, a closed interior drum adapted to contain the liquid to be pasteurized and having trunnions resting in said supports, a spur-gear mounted on one of said trunnions, a manually-rotatable shaft journaled in the wall of said vessel and longitudinally displaceable in its bearings, a spur-gear mounted on said shaft and adapted to mesh with said first-mentioned gear when said shaft is pushed inwardly and to be withdrawn out of the way of said gear when drawn outwardly, said drum having a charging-opening in one end thereof, and a closure-plate adapted to seal said opening.

3. A pasteurizer comprising an outer vessel adapted to contain a water-bath and having bearing-supports therein, a closed interior drum adapted to contain the liquid to be pasteurized and having trunnions resting in said supports, a spur-gear mounted on one of said trunnions, a manually-rotatable shaft journaled in the wall of said vessel and longitudinally displaceable in its bearings, a spur-gear mounted on said shaft and adapted to mesh with said first-mentioned gear when said shaft is pushed inwardly and to be withdrawn out of the way of said gear when drawn outwardly, said drum having a charging-opening formed in one end thereof, and a closure-plate adapted to seal said opening and carrying one of the trunnions of said drum.

4. A pasteurizer comprising an outer vessel adapted to contain a water-bath and having bearing-blocks mounted therein, a closed interior drum adapted to contain the liquid to be pasteurized and having trunnions removably mounted in said blocks, a gear mounted on one of said trunnions, a crank-shaft mounted in the wall of the vessel, a gear mounted on said crank-shaft and intermeshing with said first gear, and a crank mounted on the outer end of said crank-shaft.

5. A pasteurizer comprising a vessel adapted to contain a water-bath, bearing-blocks mounted on the inner walls of said vessel, a cylindrical drum having axial trunnions adapted to rotate in said bearing-blocks, one of said trunnions being formed with an axial bore, a tube extending through said bore and having its ends bent at right angles thereto, and means for holding said tube in a stationary position while said drum is being rotated.

6. A pasteurizer comprising a vessel adapted to contain a water-bath, bearing-blocks mounted on the inner walls of said vessel, a cylindrical drum having axial trunnions adapted to rotate in said bearing-blocks, one of said trunnions being formed with an axial bore, a tube extending through said bore and having its ends bent at right angles thereto, means for holding said tube in a stationary position while said drum is being rotated, a shaft journaled in the wall of the outer vessel, means connecting said shaft with said drum to turn the same, and means for turning said shaft.

7. A pasteurizer comprising a vessel adapted to contain water, a cylindrical drum having axial trunnions mounted to rotate on a horizontal axis within said vessel, a closure-plate closing one head of said drum, a radial paddle extending from the wall of said drum internally, a plug closing an aperture in the side of said drum, a gear-wheel mounted on one of the trunnions of said drum, a second gear-wheel meshing with said first gear-wheel, a shaft on which said second gear-wheel is mounted and which is journaled in the wall of said vessel, and means for rotating said shaft.

8. A pasteurizer comprising an outer vessel adapted to contain a water-bath, a closed drum having axial trunnions rotatably mounted on a horizontal axis within said outer vessel, a closure-plate adapted to close one head of said vessel and having one of the trunnions forming a part thereof and formed with an axial bore, a doubly-bent tube extending through said bore and having its ends bent into upwardly-extending vertical position, means for rotating said drum, and means for securing the outer end of said doubly-bent tube in upright vertical position.

9. A pasteurizer comprising an outer vessel adapted to contain a water-bath, a closed drum having axial trunnions rotatably mounted on a horizontal axis within said outer vessel, a closure-plate adapted to close one head of said vessel and having one of the trunnions forming a part thereof and formed with an axial bore, a doubly-bent tube extending through said bore and having its ends bent into upwardly-extending vertical position, means for rotating said drum, and means for securing the outer end of said doubly-bent tube in upright vertical position, the bearing-blocks supporting said trunnions being arranged to release the latter to permit said drum to be removed.

10. A pasteurizer comprising an outer vessel adapted to contain water, a pair of bearing-blocks mounted on the inner walls of said vessel and having pivoted caps, an inner sterilizing-drum having axial trunnions adapted to be removably mounted in said blocks and secured in position by said caps, means for securing said caps in position and for releasing the same, a tube extending through one of the trunnions of said drum and having its ends bent into upright vertical position, means for holding said tube in such position while the drum is being rotated, a gear-wheel mounted on the other trunnion, a crank-shaft having a gear meshing with said first-mentioned gear, means for preventing the longitudinal motion of said shaft to keep said gears in mesh, said means being releasable to permit the shaft to be pulled out of the way so that said drum may be taken out of said vessel, and a closure-plate adapted to cover an aperture in said drum through which material to be sterilized is inserted, substantially as described.

11. A pasteurizer comprising an outer vessel adapted to contain water, a pair of bearing-blocks mounted on the inner walls of said vessel and having pivoted caps, an inner sterilizing-drum having axial trunnions adapted to be removably mounted in said blocks and secured in position by said caps, means for securing said caps in position and for releasing the same, a tube extending through one of the trunnions of said drum and having its ends bent into upright vertical position, means for holding said tube in such position while the drum is being rotated, a gear-wheel mounted on the other trunnion, a crank-shaft having a gear meshing with said first-mentioned gear, means for preventing the longitudinal motion of said shaft to keep said gears in mesh, said means being releasable to permit the shaft to be pulled out of the way so that said drum may be taken out of said vessel, a closure-plate adapted to cover an aperture in said drum through which material to be sterilized is inserted, and a radial paddle or blade extending inwardly from the inner wall of said drum.

In witness whereof we have hereunto set our hands in the presence of two witnesses.

STANISLAUS MORNER BARRÉ.
CHARLES MIGNAULT.

Witnesses:
THOMAS L. METCALFE,
D. S. STACPOOLE.